United States Patent [19]
Rahmouni et al.

[11] Patent Number: 5,640,207
[45] Date of Patent: Jun. 17, 1997

[54] CAMERA FOR HIGH-SPEED IMAGING

[76] Inventors: Gilbert Rahmouni, 33, rue St-Etienne des Tonneliers, 76000 Rouen, France; Clive E. Catchpole, 31050 Stafford Dr., Birmingham, Mich. 48025; Johan P. Bakker, 2440 Burleigh St., West Bloomfield, Mich. 48324-3622; Jean Pierre Servain, 54 rue Albert Thomas, 76140 Pepit Quevilly, France; Jean Claude Cefelman, 5 le Clos de Mesnil, 76570 Mesnil-Panneville, France; Gilles Debieu, 72 Quai Cavlier de la Salle, 76100 Rouen, France; David J. Concannon, 25787 Hunt Club Blvd., Farmington Hills, Mich. 48335

[21] Appl. No.: 547,430

[22] Filed: Oct. 24, 1995

Related U.S. Application Data

[63] Continuation of Ser. No. 64,606, May 19, 1993, abandoned.

[51] Int. Cl.6 .................................................. H04N 5/225
[52] U.S. Cl. ............................................ 348/374; 348/373
[58] Field of Search ........................... 178/30; 348/373, 348/374; H04N 5/225

[56] References Cited

U.S. PATENT DOCUMENTS

| | | | |
|---|---|---|---|
| 3,830,975 | 8/1974 | Potter | 178/30 |
| 4,069,588 | 1/1978 | Hoppe | 33/1 M |
| 4,097,908 | 6/1978 | Chou et al. | 360/76 |
| 4,109,158 | 8/1978 | Blitchington et al. | 250/548 |
| 4,318,135 | 3/1982 | Allis et al. | 358/294 |
| 4,484,704 | 11/1984 | Grassauer et al. | 228/180 A |
| 4,569,565 | 2/1986 | Golden | 439/252 |
| 4,652,930 | 3/1987 | Crawford | 348/357 |
| 4,803,557 | 2/1989 | Bridges | 348/374 |
| 4,934,958 | 6/1990 | Julian | 439/504 |
| 5,263,868 | 11/1993 | Renn et al. | 439/67 |
| 5,321,351 | 6/1994 | Swart et al. | 324/758 |

*Primary Examiner*—Wendy Garber
*Assistant Examiner*—Andrew B. Christensen

[57] ABSTRACT

A mounting array for a planar photo-sensitive imaging CCPD disposed in a camera and adapted to facilitate both position-adjustment and securement of the CCPD in five senses, i.e. Left/Right, up/down, in/out, pitch angle and red angle; third array comprising a planar circuit board for receiving and carrying the CCPD; a pair of like threaded posts projected from the camera to penetrate through respective oversized holes in the board; two pairs of front/rear washers each adapted to adjustably affix the board on a respective post and so facilitate Left/Right, up/down and roll angle adjustment of the board in the oversized holes; the washer means also facilitating in/out adjustment of the board and, by differential-adjustment between both washer pairs further facilitating pitch angle adjustment.

7 Claims, 9 Drawing Sheets

CAMERA FOR HIGH-SPEED IMAGING

This application is a continuation, of application Ser. No. 08/064,606, filed May 19, 1993, now abandoned.

This invention relates to the use of precision camera equipment, especially in high-speed, line-scanning video imaging systems.

BACKGROUND FEATURES

Workers are aware that many new and innovative high speed line-scanning video imaging systems have recently been developed. Examples are described n U.S. Pat. Nos. 5,063,599, 5,063,461 and 5,144,457. Such systems have typically employed high-precision solid-state imager means (e.g. Charge-Coupled Photo Devices, or CCPDs) to register an optical image and convert it to a digital signal. The development of such CCPD devices has only reached a certain point, and devices of this type which are commercially available have a relatively small sensing area, typically of the order of 1.00" (15 mm) long. Our applications for these devices typically involve the imaging of financial documents, eg bank checks, which are much larger, eg of the order of 5.00" (125 mm) high.

Thus, we require an optical system which reduces the size of the image of the document to fit upon the sensing area of the CCPD. This, in turn, requires that we be able to adjust the position of the CCPD relative to the optical system in several axes, in order to compensate for variations in the CCPD relative to the optical system in several axes, in order to compensate for variations in the CCPD, the optical system and the mechanical parts of the system, and then secure the CCPD in the correct position to a very high degree of accuracy.

Previous designs of high-speed line-scanning video cameras have been intended for use in large, high volume, high cost systems, with generally low rates of production, where the cost of obtaining and securing such adjustments to the CCPD has been less significant when considered as part of the overall cost of the system. Now, however, we are developing imaging systems of far lower cost and also of significantly larger production volumes, and the cost (in both time and money) of obtaining and securing such adjustments has become a critical factor in the overall system development.

Such constraints become difficult to meet when one attempts to apply them to a low-cost imaging system—and this is our problem.

Accordingly, we have developed a new method of so adjusting and fixing the CCPD device as to satisfy the optical and mechanical requirements of a high-speed line-scanning video image camera, while allowing for the use of the latest high-volume, low-cost electronic equipment and production methods.

The CCPD devices used in these cameras are typically low precision in their mechanical assembly. They are typically offered in mechanical packages very similar to the familiar "integrated circuit" or "chip" package, and the location of the critical photosensitive surface inside the package is very poorly related to any external feature of the package. With normal mechanical tolerances, positioning errors of ±0.040–0.080" (±1.00–2.00 mm) may easily be generated, with unacceptable effects upon the focus, magnification and alignment of the optical system. Additionally, angular errors of position may also be generated by an accumulation of tolerances, and these are similarly unacceptable to the optical system. Accordingly, some better means of adjusting the CCPD, both in its location and angular positions, must be incorporated in order to suppress these unwanted effects. This is our object here.

We found that the positional location of the CCPD should typically be better than ±7 micrometers (±0.000275"), and the angular location of the CCPD should be better than ±0.75°, in order to reliably produce a system which meets our desired focus, magnification and alignment requirements (i.e. in an optical system which may be reasonably constructed using conventional tolerances, techniques and readily available commercial parts of reasonable cost.) Angular precision is important chiefly in the "roll" and "pitch" directions—because the CCPD device has a sensitive area which has essentially zero width and a wide angle of acceptance; "yaw" variations have no significant impact upon the camera system so long as they are less than approximately ±5.0°. Each of these adjustments must be separate and independent of the others, in order to compensate for all potential errors in the positioning of the CCPD.

In previous designs, these adjustments have been obtained by mounting the CCPD on a special, high-precision carrier plate, typically by bonding it thereto with an epoxy adhesive while it is secured in a special adjusting fixture. Such fixtures have typically embodied many precision micrometer-type adjustments for the CCPD, with microscope eyepieces to accurately check the position of the device. Their use demands skilled operators and careful control and calibration of the fixtures, in order to produce a reliable assembly. Additionally, the process is time consuming, both in the adjustment itself, and also in the typically long cure times (several hours) for the epoxy adhesives typically used.

While such techniques are acceptable for large and expensive machines where the rate of production is low, they cannot be used for smaller, lower-cost systems with far higher rates of production. In addition, such techniques give considerable problems in other fields, such as the making of reliable electronic connections to the CCPD device, the high cost of the device as a service part (due to all the hardware, time and labor now associated with it), and the difficulty of ensuring the quality of such an assembly.

More particularly, this innovation involves a technique of mounting a CCPD directly on an associated PCB (printed circuit board), adjusting it in five (5) axes ("X, Y, Z, roll, pitch") and then securing the adjustment using soft-solder and other simple techniques (e.g. as opposed to more conventional epoxy bonding).

Mounting such precision CCPDs presents a challenge to the designer of a camera system. For instance, the:

High precision usually required to give correct mounting position and angle; as noted above.

Various mounting methods have been contemplated to overcome these problems. One solution might be to mount the CCPD in a special high-precision carrier, typically bonding it in place using a special adjusting fixture, as noted above. While such a system has merit, it has several drawbacks, among which are:

i) The use of ancillary components (e.g. carrier and adhesive system) between the CCPD and the (camera body) mount surface. To maintain required mounting accuracy, each of these components must be made to very high accuracy, so that their combined tolerances will not exceed the overall acceptable mounting tolerance for the CCPD. The adhesive system should bona the mirror to the carrier using a locating fixture with very high accuracy and corresponding high cost.

ii) The adhesive system must be designed so that it can accommodate the large differential thermal expansion/contraction between the CCPD and carrier yet such an adhesive may not be sufficiently stiff to maintain the required positional accuracy for the CCPD.

iii) The cost and time (manufacturing) with such a system. Bonding CCPDs to these accuracies requires skilled staff and costly fixtures, and the bonding process may be very time-consuming and require special facilities, such as curing ovens and mixing, dispensing and safety equipment. Additionally, any bonding system is prone to high losses due to contamination of the CCPDs or carriers with adhesive, due to bonding problems, due to poor adhesive preparation, and other like factors which are difficult to control.

Accordingly, it is an object hereof to ameliorate (at least some of) the foregoing difficulties and provide related advantages, as will become more evident upon considering the following disclosure, in conjunction with the accompanying drawings.

DESCRIPTION OF FIGURES

The methods and means discussed herein, will generally be understood as constructed and operating as presently known in the art, except where otherwise specified; with all materials, methods and devices and apparatus herein understood as implemented by known expedients according to present good practice.

FIGS. 1 is an isometric view depicting a general arrangement of a check-processor/-imaging unit apt for using the invention; while

CAMERA CONTEXT

Figure 1:
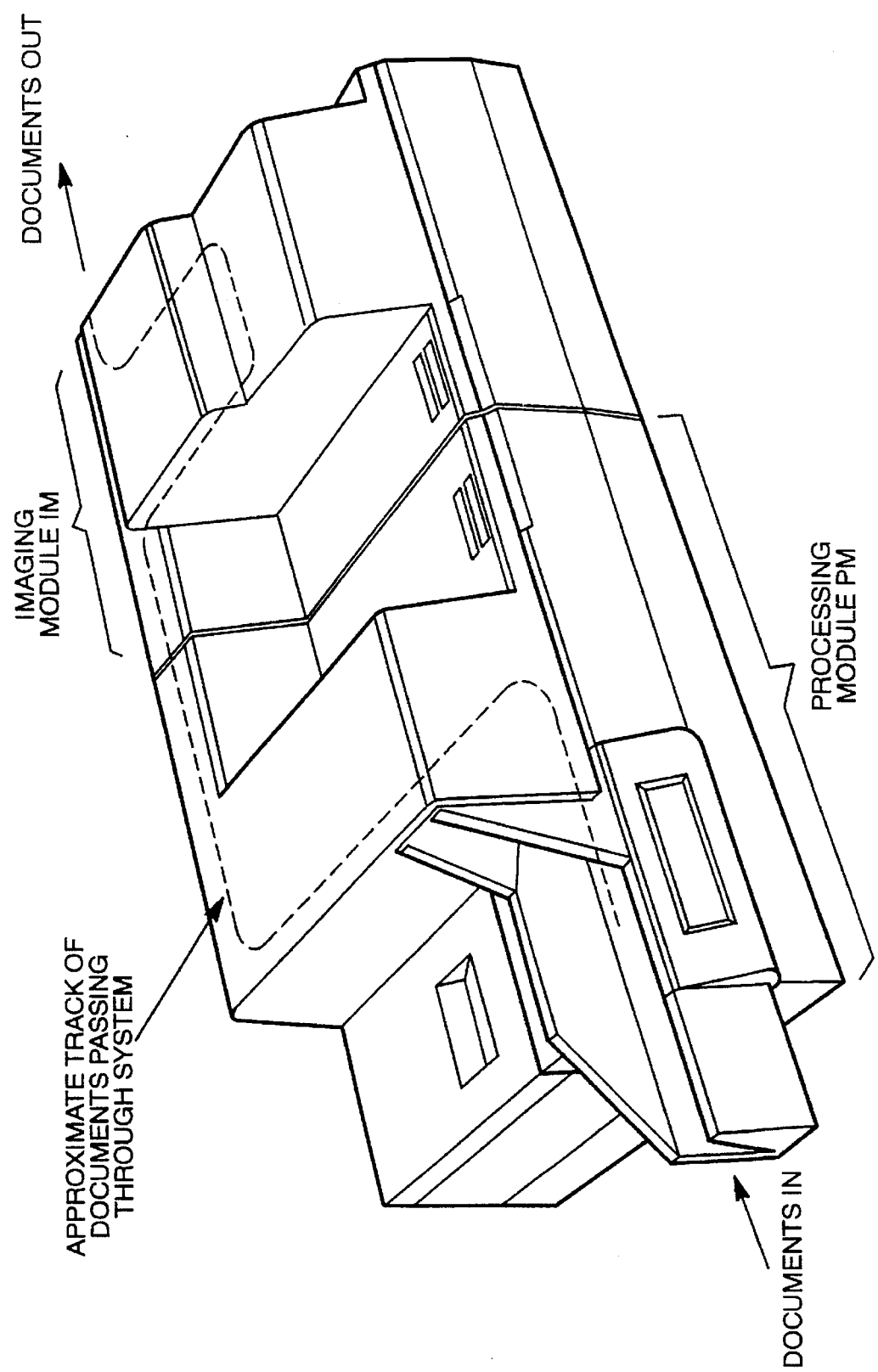

FIG. 1 depicts a medium-speed, low volume check processing system apt for using the invention.

Figure 2:
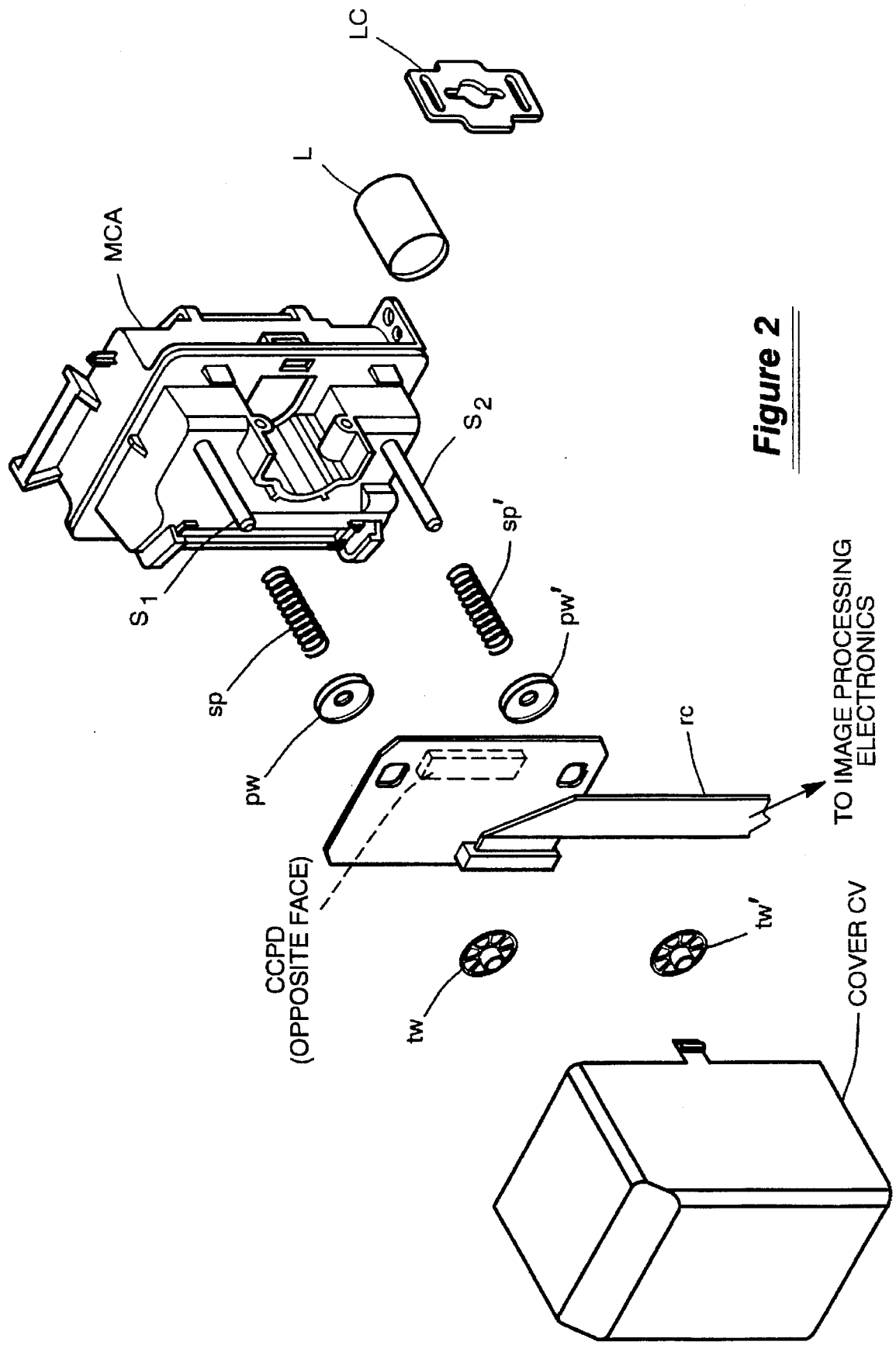
FIG. 2 is an exploded isometric, partial view of one camera thereof.
Figure 7:
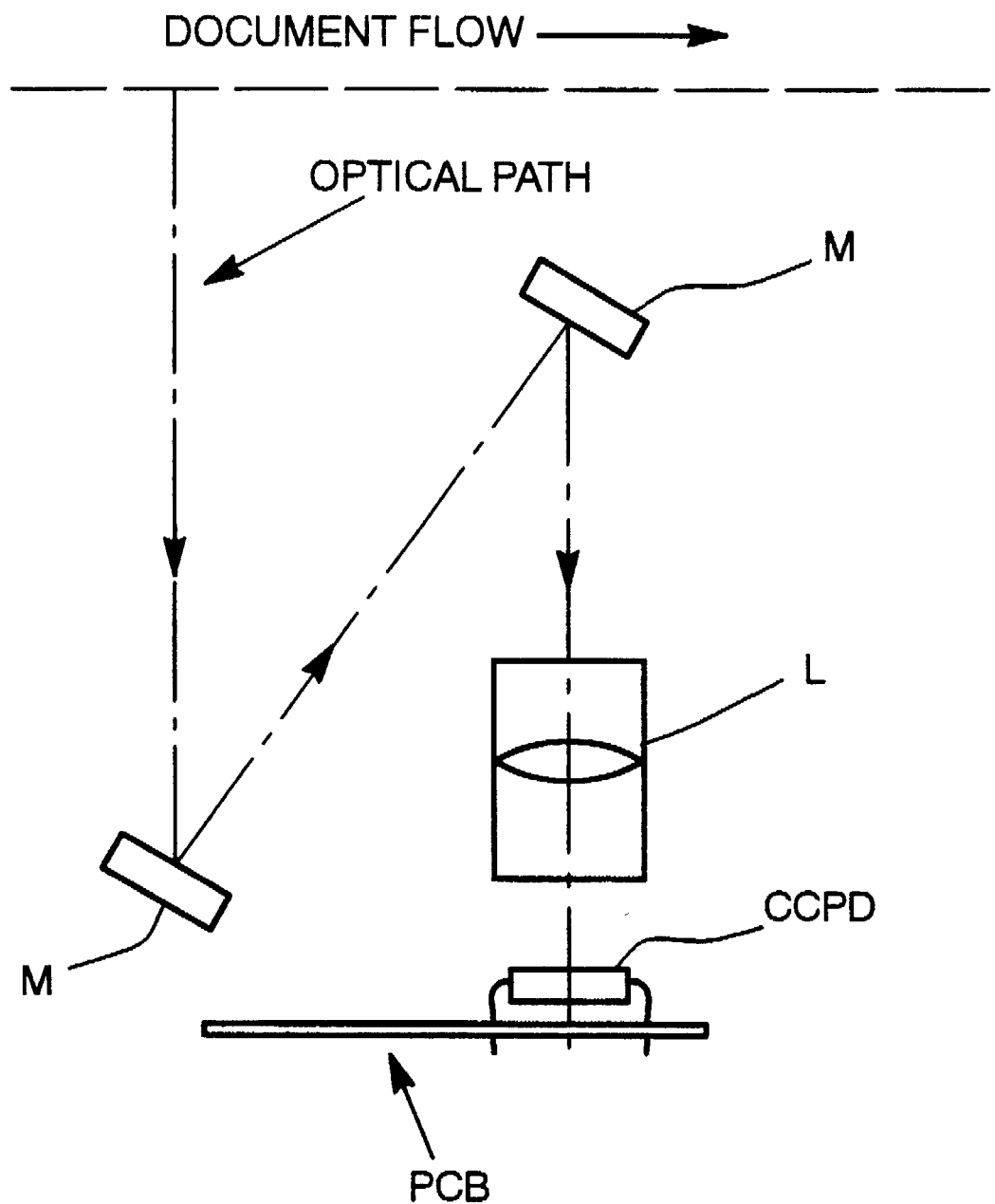
FIG. 7 is a schematic of the optical path within the subject camera.

FIG. 2 depicts the low-speed imaging camera especially adapted to use the invention, while FIG. 7 schematically indicates the optical path within the camera.

Figure 3:
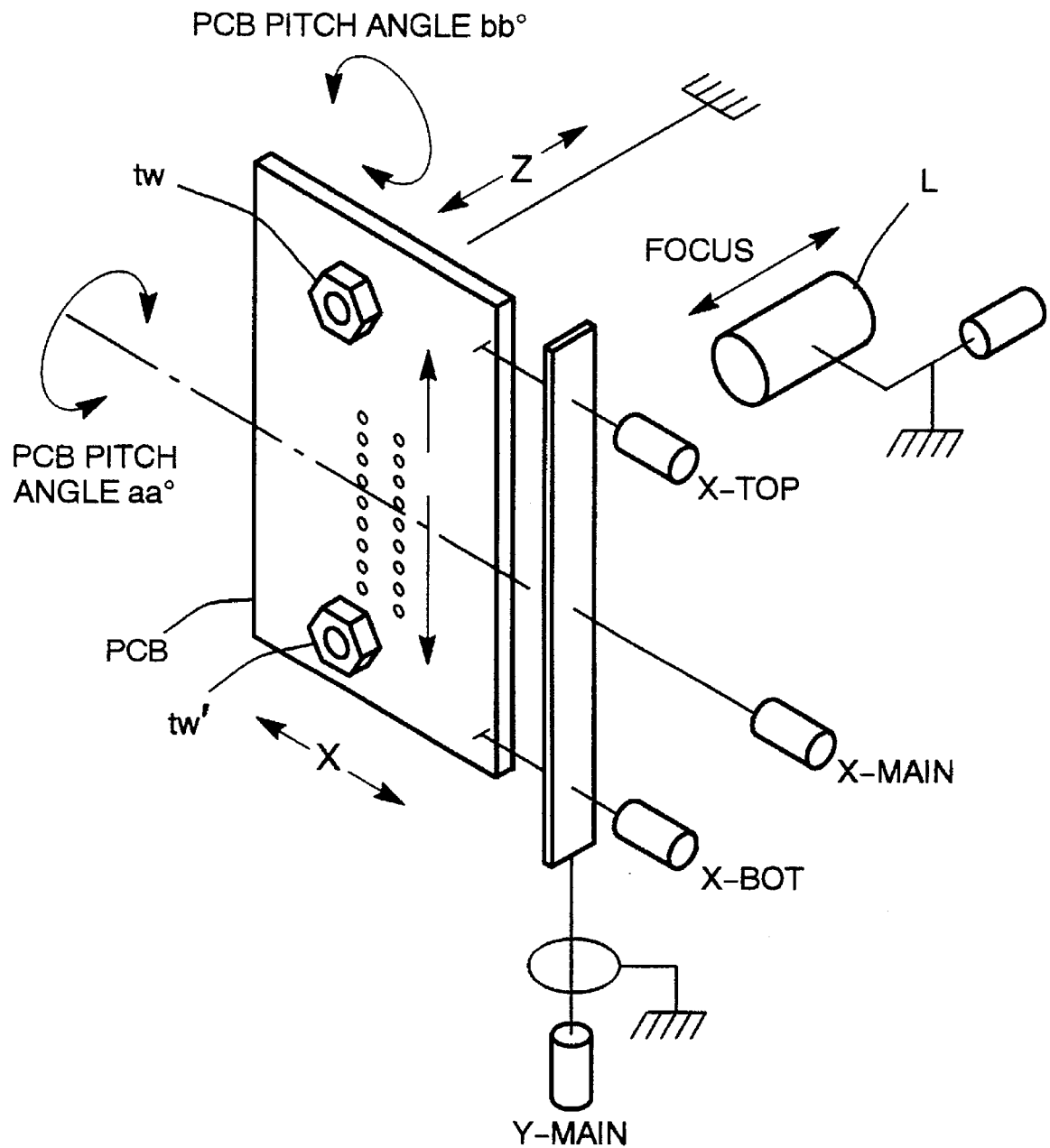
FIG. 3 is a schematic, functional view of a PCB adapted as a preferred embodiment for mounting an associated CCPD according to invention and adapted to be integrated into the exemplary camera, depicted in FIG. 2.

FIG. 3 is a semi-schematic, very functional view of a camera PCB, seen from two directions, adapted as a preferred embodiment for mounting an associated CCPD according to the invention and adapted to be integrated into the exemplary camera shown in FIG. 2. Also shown and defined are the five degrees of motion of the CCPD which are required to be adjusted -left-and-right (X-direction), up-and-down (Y-direction), in-and-out (Z-direction), pitch angle (aa°) and roll angle (bb°).

Figure 4:
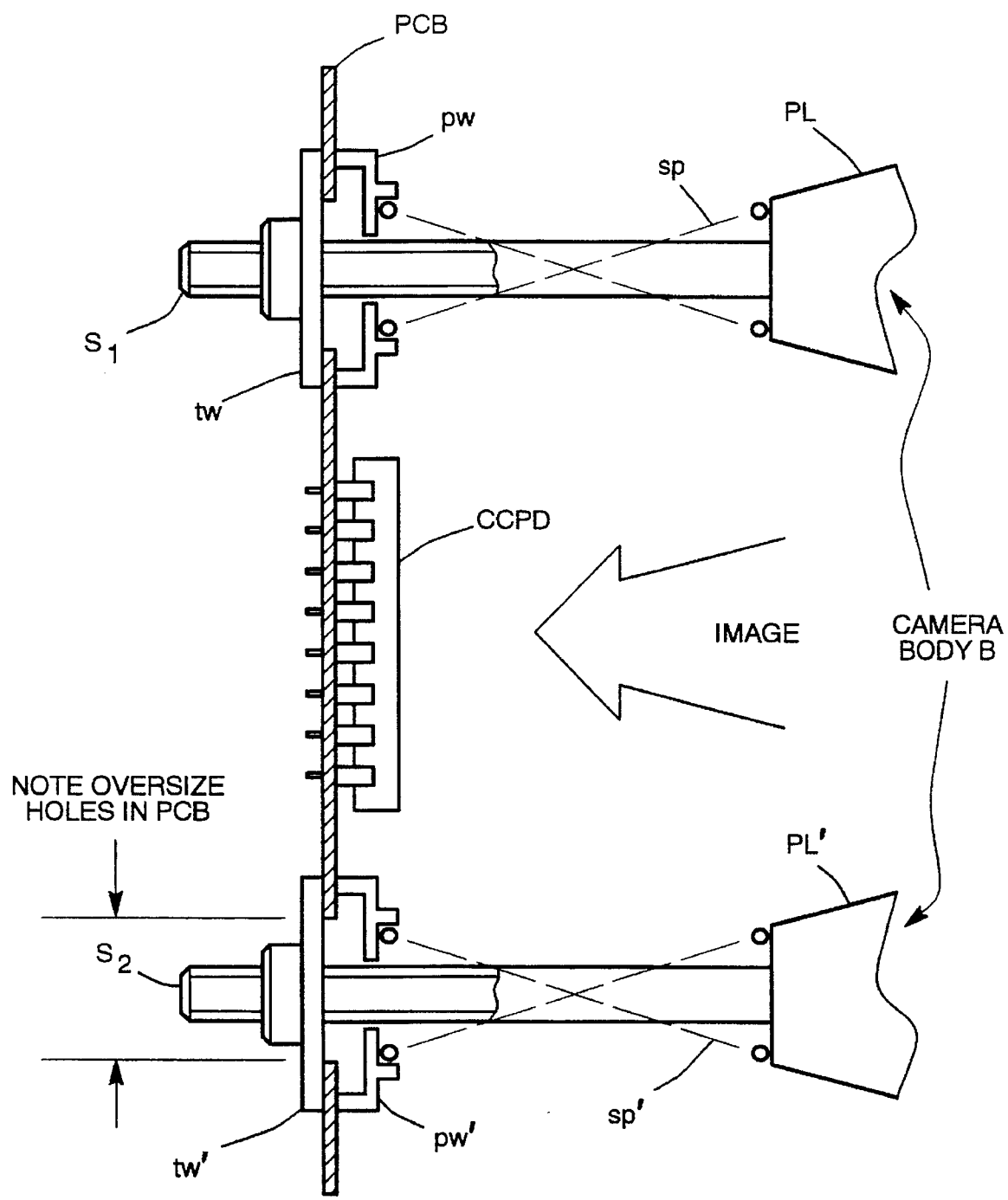
FIGS. 4, 4A are side sectional views of this embodiment, showing special "Flex-Lock" retainer piece, this piece shown in enlarged the CCPD and various mounting accessories.
Figure 4A:
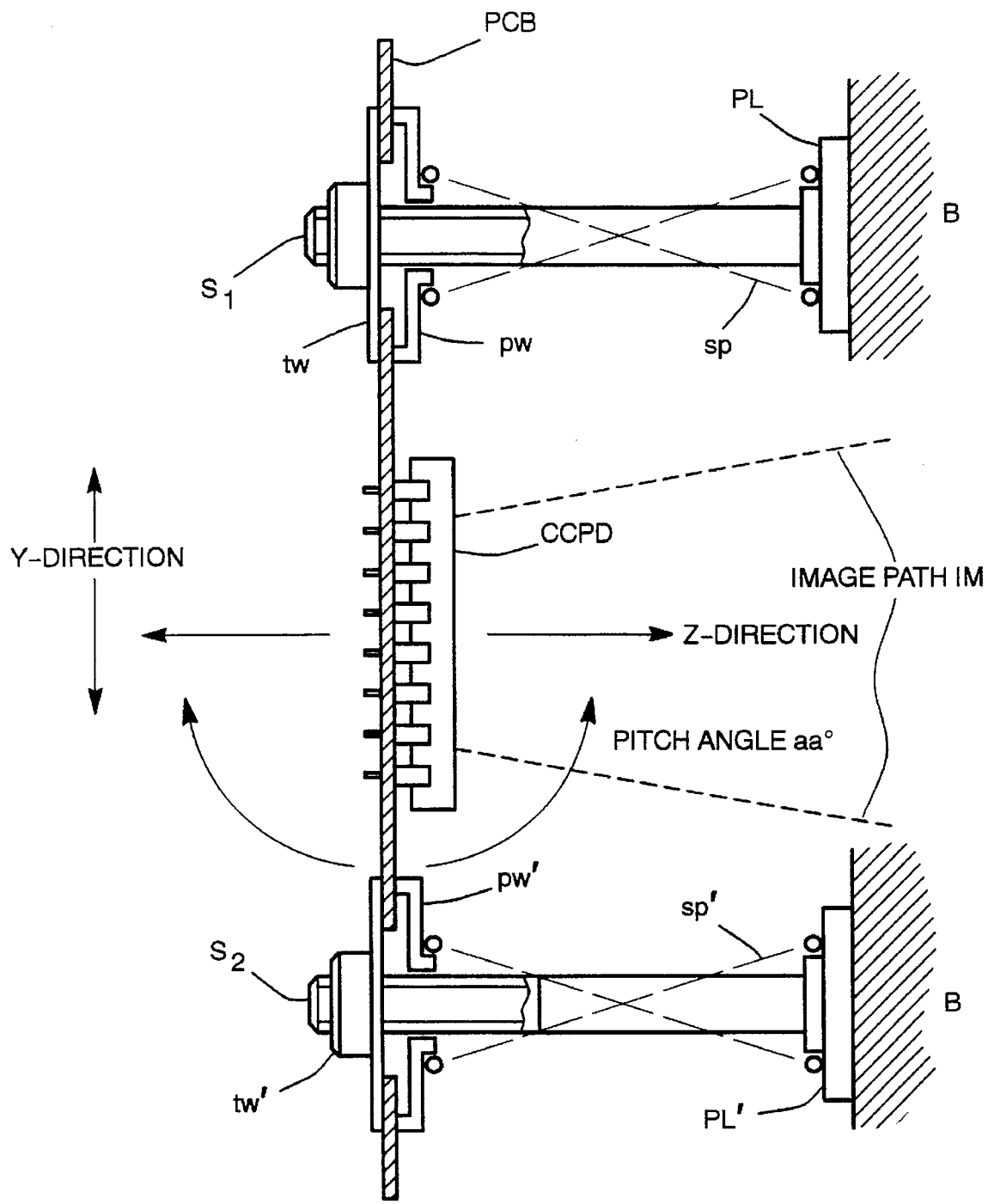

FIGS. 4, 4A are side sectional views of this embodiment, showing the integration of the PCB and associated CCPD into the exemplary camera depicted in FIGS. 1 and 2.

FIG. 1 may be understood as useful in a check processing system, e.g. the Unisys DP-35 having relatively low-speed, low volume (throughput) and low cost, being especially adapted for imaging and sorting financial instruments such as checks. This system is intended as a point-of-transaction device, intended for large-volume production, wherein low cost and high sustained rates of production are paramount. FIG. 2 depicts an imaging camera especially adapted for use in such a system and for capturing and processing images of said financial instruments as they pass through the system.

This check processor preferably comprises a Processing Module PM coupled (preferably removably; e.g. snapped-on) to an associated Imaging Module PM, which preferably comprises a pair of (Front, Rear) like camera units for imaging front/rear portions of passing checks or like documents. The Processing Module PM will be understood as the basic module, including document-transport, -imprinting, -detect (eg. MICR reader) means, and to be adapted to accept checks (or the like) at an entry tray (see "IN arrow, FIG. 1) and advance them continuously, and singly, to Imaging Module IM (e.g. see dotted-line Transport path in both modules).

The two camera units of Imaging Module IM will, of course, generate an image of each side of the check (e.g. one such unit at front area of IM, the other at rear, with documents advanced therebetween, and then ejected; e.g. preferably to downstream sort-pockets, and/or other after-processing stations:; none shown, but well known in this art).

Camera

The camera itself is composed of a sealed body made of several parts which are bonded together permanently during assembly. The individual camera parts are made of a polycarbonate resin reinforced with glass fiber to give the requisite stiffness and rigidity. These parts are made by an injection-molding process. The various parts of the camera contain various mounting features and devices by which the optical components of the system (mirrors, lenses and the like) are permanently mounted, as known in the art.

One of the (like) cameras in partially-illustrated in FIG. 2, an exploded view showing a main camera assembly, associated lens and lens clamp, together with a printed circuit board, PCB, mounted thereon, and a cover CV (located beneath the module IM, and thus not visible in FIG. 1). This PCB array is detailed in FIGS. 3-6 and described below, as a preferred embodiment (except for ribbon cable rc for the electronics on PCB).

While this preferred embodiment is especially designed and adapted for use with camera bodies made reinforced thermoplastic resins, the design could be equally well adapted to cameras made of other materials and by other techniques, including many other plastics and metals which might be more suitably adapted to the manufacture of a camera in a particular case.

CCPD mounting

As mentioned, we decided to mount the subject CCPD directly on the associated PCB, which, in turn, would be mounted on the camera body. The CCPD will be understood as fastened onto the PCB as indicated in FIGS. 4, 4A to receive the final projected images as indicated by arrow IM in FIGS. 4, 4A (and from the lens system functionally sketched in FIG. 7).

Figure 6A:
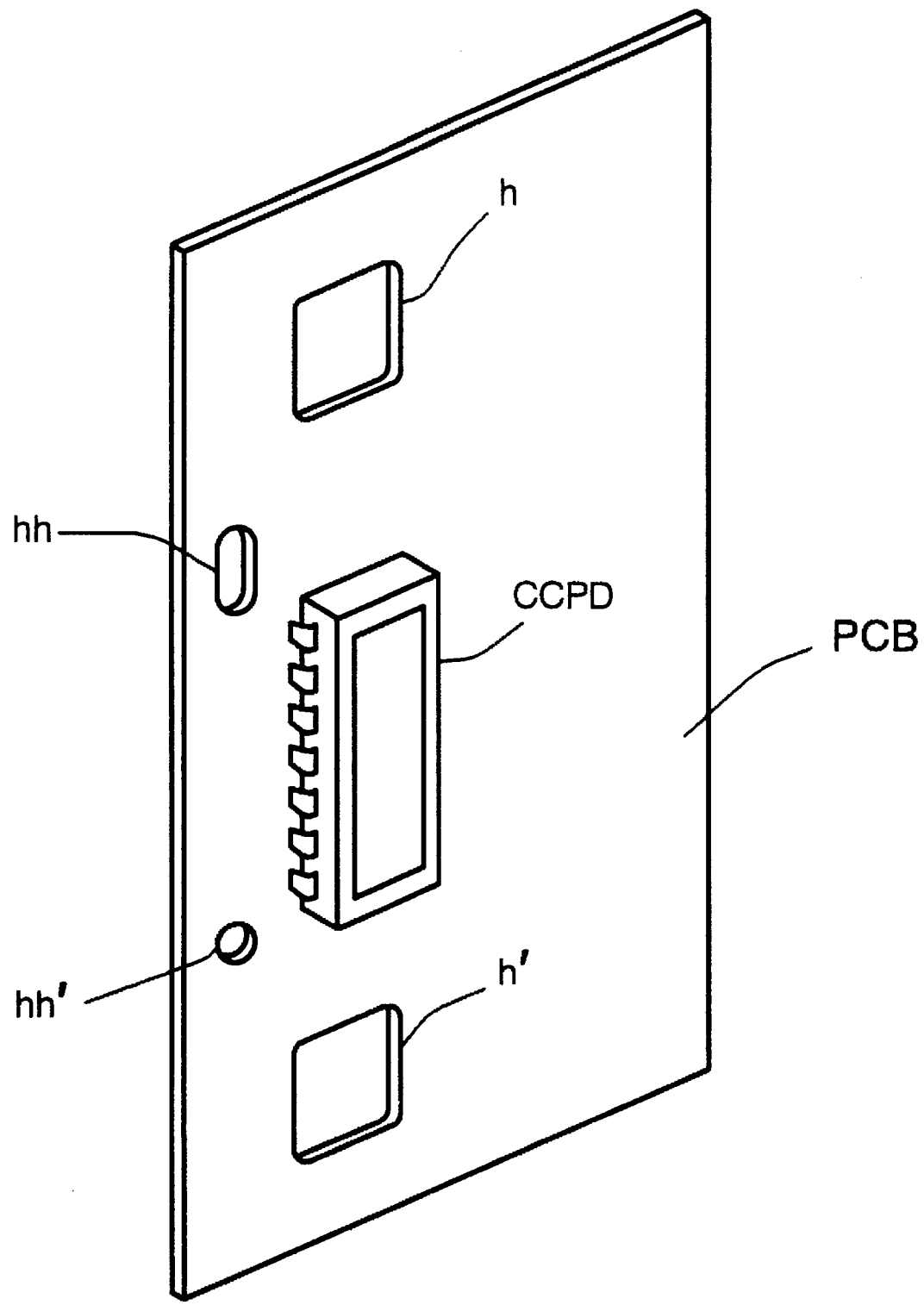
FIGS. 6A, 6B are respective isometric front, rear views of the PC board embodiment of FIGS. 3-5.
Figure 6B:
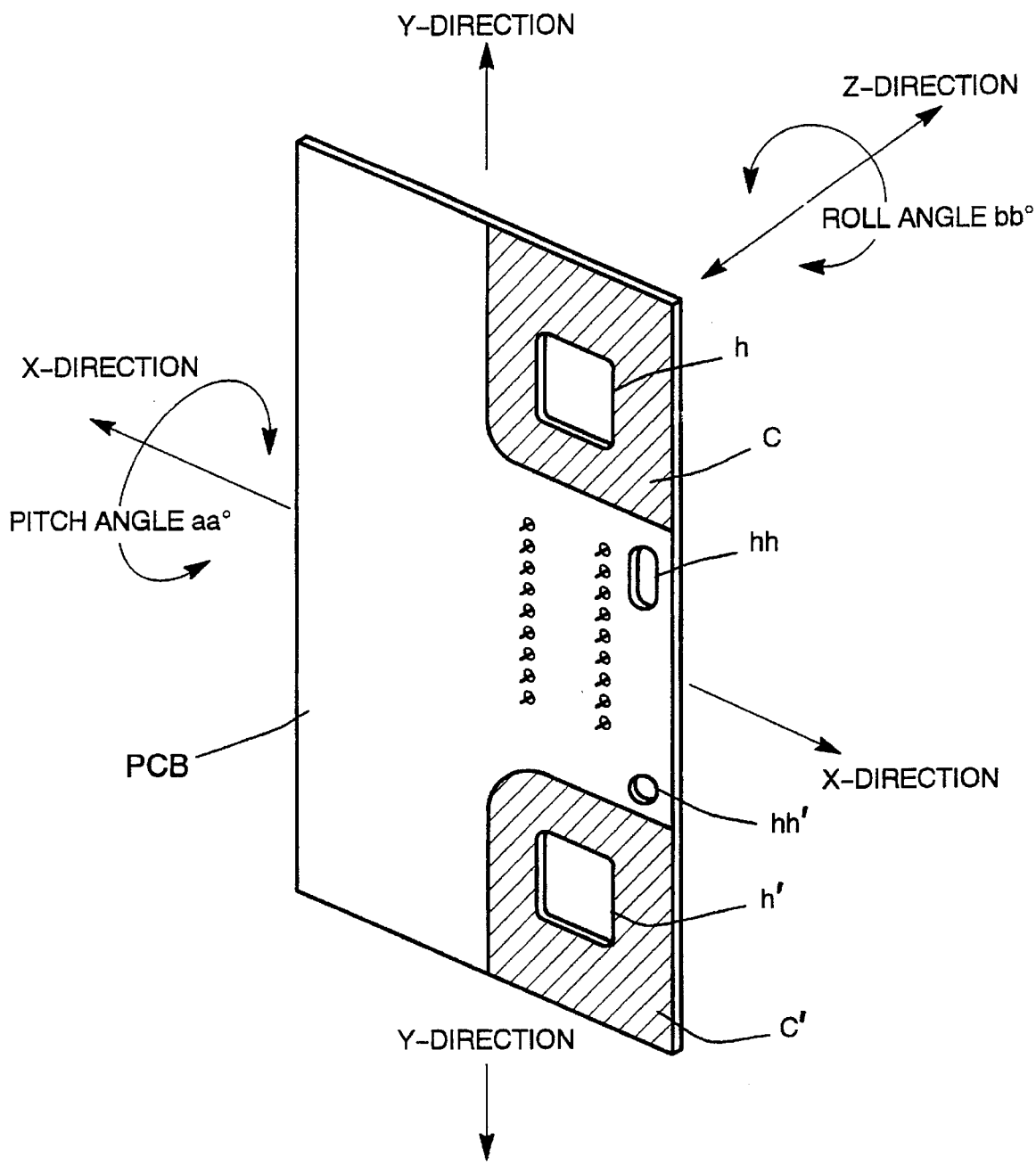

FIGS. 3, 4 and 4A illustrate how the CCPD is mounted to the PCB, according to this invention. To achieve the desired targets of cost and rate of production we prefer to mount the CCPD directly to a printed circuit board (PCB), using common soldering techniques well-known in the art. The PCB is conventionally made of a glass-fiber reinforced thermosetting plastic, coated with copper on both sides, which is etched and plated to form the interconnecting leads of the electronic circuitry mounted thereon, as known in the art. The PCBs used in the preferred embodiment are manufactured of conventional materials and by conventional techniques, and need contain no special materials or processes in their manufacture. FIGS. 6A, 6B illustrate how a PCB should be modified to include holes h,h' for studs S1, S2 and holes hh, hh' for fixture pins. In addition to the CCPD, the PCB also contains certain signal conditioning and processing circuitry which is required to be mounted as close to CCPD as is practical (to avoid undesired electromagnetic effects and obtain the desired amplification of the CCPD signals in the most efficient manner). Accordingly, the CCPD may be mounted to the PCB just as any other component of the circuitry, using common PCB assembly techniques as known in the art. FIGS. 6A, 6B show a preferred PCB embodiment.

The PCB is then mounted upon the camera body such that the CCPD will receive the projected image of the documents, (e.g. see FIG. 7; a document image IM is schematically indicated in FIG. 4 as transmitted to it by the optical system of the camera, which is schematically indicated in FIG. 3.

Adjustment of the CCPD/PCB:

With the CCPD thus affixed on the PCB, we may then make our 5-way positioning adjustments on the PCB an entirety. That is, to compensate for various inaccuracies, the PCB (CCPD thereon) needs to be adjustable in five separate senses. They are: left-and-right (X-axis); up-and-down (Y-axis); in-and-out (Z-axis); PCB pitch angle (an°); and PCB roll angle (bb°). Each of these must be separately adjustable, independent of the others, to compensate for all possible errors and precisely fix the position of the CCPD.

FIGS. 3, 4, 4A, and 5 also illustrate how the CCPD is adjusted. Adjustment is achieved within the actual camera system by moving the entire PCB in 5 senses, mentioned (referred to as X, Y and Z axes, and as "roll" and "pitch"—see Figures for illustration).

To achieve these various adjustments, the PCB is mounted to the camera by means of two threaded studs, S1 & S2, which form an integral part of the camera body, B. In the preferred embodiment, these studs are assembled to respective plateaus, PL & PL', of the camera body B by means of an ultrasonic insertion process, (post molding of the camera parts.) These studs could also be inserted by molding as part of the manufacture of the camera parts, by assembly with screws, or by any one of several other techniques familiar to workers in the art.

The PCB is captured upon each of the studs $S_1$, $S_2$ between respective threaded washers, tw & tw', on the front face (FIG. 6A) and pressure washers, pw & pw', upon the rear face (FIG. 6B). The pressure washers are pressed against the PCB by means of respective helical wire compression springs, sp, sp', placed over the studs and bearing upon the inner PCB face, as shown. Holes h, h', in the PCB through which the studs pass are made of sufficient size to allow the required range of movement of the PCB in the X and Y directions. In the instant case, the required range of movement to cancel all potential X and Y errors in the entire system has been calculated to be ±0.086" (±2.20 mm).

It will then be seen that the PCB may be adjusted in the Z direction by rotating the two threaded washers tw, tw' synchronously, causing them to move inward or outward upon the studs by means of the screw threads thereon. The PCB will move inward or outward as required, being always held firmly against the inner surfaces of the threaded washers by the action of springs sp, sp'. In the instant case, it has been calculated that the PCB must have a range of adjustment in the Z direction of ±0.209" (±5.315 mm) about a nominal position to compensate for all potential variations in the CCPD and the optical path of the camera.

Similarly, the pitch angle aa° (FIG. 3) may be adjusted by rotating threaded washers tw & tw' differentially, to move the upper or lower edge of the PCB in or out relative to its other edge. The required range of adjustment along the studs to achieve the desired range of adjustment of pitch angle aa° has been incorporated into the calculations for the range of adjustment required the Z-direction. The roll angle bb° of the PCB may adjusted by rotating the PCB as shown, the enlarged holes in the PCB through which the studs pass giving the desired range of adjustment. The required range of adjustment of roll angle bb° has been incorporated into the calculations for the range of adjustment required in the X- and Y-directions.

Figure 5:
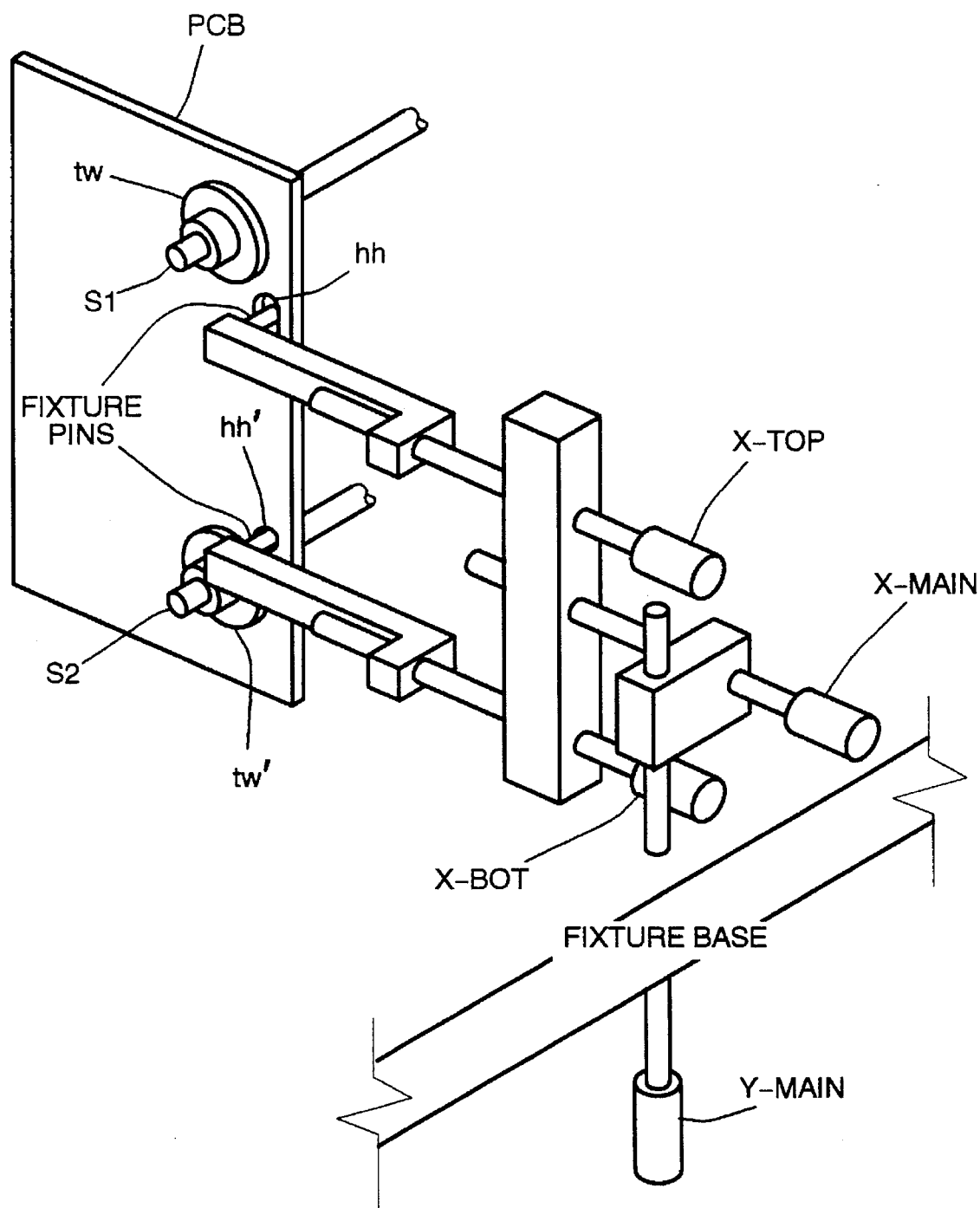
FIG. 5 is a schematic representation of an adjusting fixture for the preferred camera (expanding on FIG. 4)

All of these adjustments are obtained by mounting the camera assembly in an adjusting fixture, Fx, which is shown schematically in FIG. 5. The camera is located to the fixture by means of locating-dowels identical to those which will locate it in the final assembly of the system, and secured by means of quick-acting toggle clamps. This fixture is furnished with micrometer screw adjustments for the X, Y and roll angle bb° adjustments, which are temporarily attached to the PCB by means of pins passing through pin-holes hh, hh' provided in the PCB (as shown in FIGS. 3, 5, 6) A single screw, Y-main, moves the entire PCB up and down as previously described to provide the Y-direction adjustment. Similarly, a single screw, X-main, moves the PCB left and right to provide the X-direction adjustment. Supplementary differential screws, X-top and X-bot, move the top and bottom corners of the PCB differentially in the X-direction to provide the roll angle adjustment bb°. Adjustment of the Z-direction and pitch angle aa° is provided by direct manipulation of the threaded washers tw & tw'.

The operator makes these adjustment while observing the waveform generated by the CCPD which is displayed for him on the monitor display screen of a PC or like signal processing device. The camera is so disposed in fixture Fx as to look at a graduated target pattern which provides various marks and alignment features which may be identified and observed in the output of the CCPD on the PC screen by the operator. Also displayed on the PC screen are "target" or "nominal" patterns which guide the operator to adjust the camera to achieve the desired patterns from the camera being adjusted.

PC software is devised to aid him in this procedure and electronically compare the waveform obtained from the camera to an "ideal" waveform stored in PC memory. Messages displayed upon the PC screen advise the operator whether or not the camera is adjusted within acceptable limits and, if not, what adjustments he must make.

In a further development, one may automate this process entirely by motorizing the various adjustment screws and, by a system of feedback to the PC, allowing the PC to adjust the position of the PCB until its output matches the "ideal" output stored in the PC memory. Additionally, the PC has a memory facility for storing the final, adjusted output of the camera when instructed to do so by the operator, giving a permanent record of the camera which may be subsequently used for statistical and quality control analysis.

SECURING:

Once the operator has determined that the camera is adjusted acceptably, all moveable elements must now be permanently and immovably secured to hold them in position. This is achieved in two stages.

First, the two threaded washers, tw, tw', are permanently secured to their respective studs by means of a fast-acting, penetrating adhesive. In the instant case, we prefer a low-viscosity, anaerobic cyanoacrylate adhesive, "Loctite 420". This may be applied to the threads of the stud and washer without disturbing the adjustments in any way, and will cure to an immovable bond in approximately one minute. The Z-direction and pitch angle aa° adjustments are thus permanently locked in place. While the use of adhesives is preferably to be avoided, this particular application is essentially "self-fixturing" and pin-point, and the adhesive cures very quickly, so that we may tolerate it here. Other securing methods, such as self-locking fasteners, interfering threads and the like, familiar to workers in the art, could also be employed.

Secondly, the threaded washers, tw, tw', are permanently secured to the face of the PCB by soft-soldering them around their periphery in several places to copper pads, C, C' provided on a rear face of the PCB. [e.g. see FIG. 2] These pads may be identical in material and finish to the other pads and tracks provided on the face of the PCB for the assembly of electronic circuit components, and thus obtained as part of the PCB at no additional cost. The washers are made of a material which is easily soldered. In the instant case, the washers are made of a free-cutting yellow brass alloy, which may be readily soldered. Other materials or surface treatments, familiar to workers in the art, could be used to assist in this process.

Additionally, the washers used in the instant case were designed with a large part of their overall volume relieved-away, to reduce their thermal mass (as indicated in FIGS. 4, 4A) and make the soldering operation quicker and easier.

Soldering is performed using a regular electronic soldering iron and tin-lead solder, as is used normally in the fabrication and assembly of PCBs. Workers will understand that other tin alloys can, in appropriate cases, be used, such as tin-silver or tin-bismuth (e.g., for low-toxicity or lower melting point).

In this manner, the final adjustments for X-direction, Y-direction and roll angle aa° are permanently secured, and the camera may be immediately removed from fixture Fx for further assembly without any cure or waiting time. In the instant case, a goal of 4 minutes was set for completing all adjustments and securing them: this goal can readily be met.

While this preferred embodiment is especially designed for use with camera bodies made of glass-fiber-reinforced polycarbonate, the PCB/CCPD design also works well in various other body materials, including many other plastics and soft metals (such as aluminum and its alloys) Very good results are obtained by making the PCB board relatively conventionally, but adding plates C, C' and drilling holes h, h', hh, hh'—evidently quite simple.

Such a "PCB-mount" is assembled easily with a minimum of tools—this preferred embodiment can be manually assembled (with the fingers) in a few minutes as aforementioned.

Variations:

The PCB/CCPD mounting technique described is found to work well for relatively small PCBs. The PCB in the preferred embodiment is approximately 2.5" (60 mm) wide by 4.0" (100 mm) high. It is found that PCB's of increasing size may bring difficulties in addition to those already noted and overcome—specifically, it becomes difficult to ensure the flatness and long-term stability of the PCB—this being important, in turn, to maintain the desired adjustments in the long-term stability of the PCB, which are important to maintain the desired adjustments in the long term, while still manufacturing it using conventional PCB techniques. In such a case, a further development of this design would consist of mounting the PCB upon a stiff and rigid carrier plate, which would then be mounted to the adjusting studs and adjusted in the same manner as described above for the PCB. Such a carrier plate would serve only to provide stiffness and stability to the PCB, and would not require any special accuracy or precision of itself. Such a plate could be made of rigid plastic or metal material, and be designed specifically to impart maximum stiffness and rigidity to the PCB. Workers in the art will readily visualize such a construction and other potential variations thereof.

The foregoing (and other like) "PCB-mount" embodiments will be seen as advantageously minimizing cost, (including special tools, materials, assembly-time) and simplifying the mounting/positioning process.

Conclusion

It will be understood that the preferred embodiments described herein are only exemplary, and that the invention is capable of many modifications and variations in construction, arrangement and use without departing from the spirit of the invention.

Since modifications of the invention are possible, the means and methods disclosed herein are also applicable to other mounting arrangements, as well as to other related and unrelated camera and optical components.

Examples given above of other possible variations of this invention are merely illustrative. Accordingly, the present invention is to be considered as including all possible modifications and variations within the scope of the invention as defined by and set forth in the appended claims.

What is claimed is:

1. A method of mounting a planar photo-sensitive imaging means disposed in camera means and adapted to facilitate both position-adjustment and securement of the imaging means in five senses, i.e., left/right, up/down, in/out, pitch angle and roll angle; this camera means including planar circuit board means; this method comprising:

adapting said circuit board means to receive and carry said imaging means and to include a number of oversized through-holes; providing two or more like threaded post means projected from said camera means, each to penetrate through a respective said oversized through-holes in said board means; providing front/rear washer means for each said post means, each washer means adapted to adjustably affix said board means on a respective post means and to so facilitate left/right, up/down and roll angle adjustment of said board means in said oversized holes; said washer means also facilitating in/out adjustment of said board and, by differential-adjustment between washer means serving to further facilitate pitch angle adjustment of said board means;

said holes being made sufficiently oversized to accommodate said adjustments;

each said washer means being made to comprise a pressure-washer and a threaded-washer adapted to threadedly engage a respective post means, and wherein spring means is also disposed on each post means so as to resiliently urge a respective pressure-washer toward said board means.

2. The method of claim 1, wherein said spring means are made to comprise helical coil springs.

3. The method of claim 1, wherein securement means is provided adjacent each oversized hole and is adapted to secure the adjusted-position of a respective washer means.

4. The method of claim 1 wherein said camera is low-cost, low-precision type apt for imaging checks like financial documents.

5. The method of claim 4 wherein said imaging is a CCPD.

6. The method of claim 5 wherein said camera is part of a low-cost, low-thruput check-processing arrangement.

7. A method of mounting a photo-sensitive imaging means disposed in camera means and adapted to facilitate both position-adjustment and securement of the imaging means in five senses, i.e., left/right, up/down, in/out, pitch angle and roll angle; this camera means including planar circuit board means; this method comprising:

adapting said circuit board means to receive and carry said imaging means; providing two or more like threaded post means projected from said camera means, to penetrate through respective oversized through-holes through said board means; providing front/rear spacer means for each said post means, each spacer means being made to adjustably affix said board means on a respective post means and to so facilitate left/fight, up/down and roll angle adjustment of said board means in said oversized holes; making said spacer means to also facilitating in/out adjustment of said board and, by differential-adjustment between spacer means to serve to further facilitate pitch angle adjustment of said board means;

said holes being made sufficiently oversized to accommodate said adjustments;

each said spacer means being made to comprise a pressure-spacer and a threaded-spacer adapted to threadedly engage a respective post means, and wherein spring means is also disposed on each post means so as to resiliently urge a respective pressure-spacer toward said board means.

* * * * *